May 24, 1960  W. A. GIBBONS  2,937,700
WINDOW SCREENS FOR AUTOMOBILES
Filed April 29, 1957
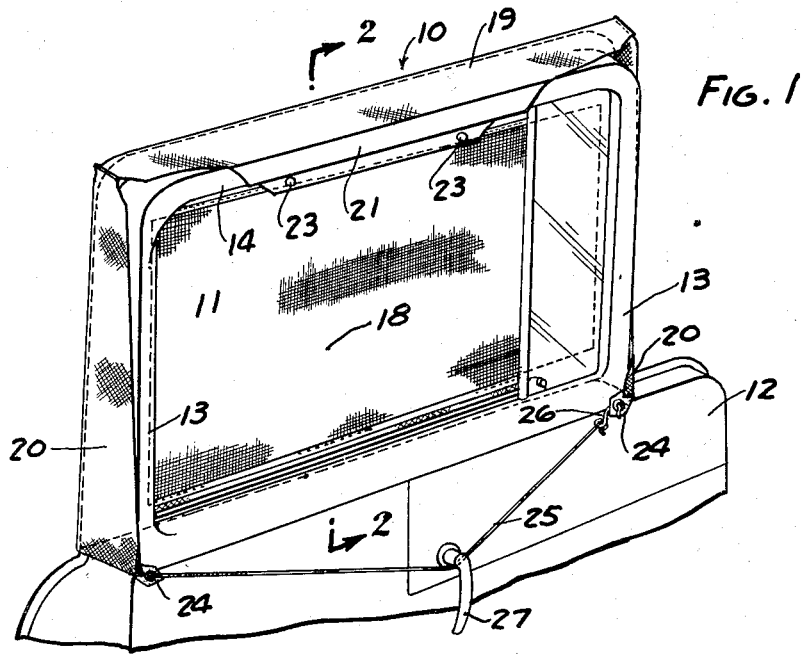
Fig. 1
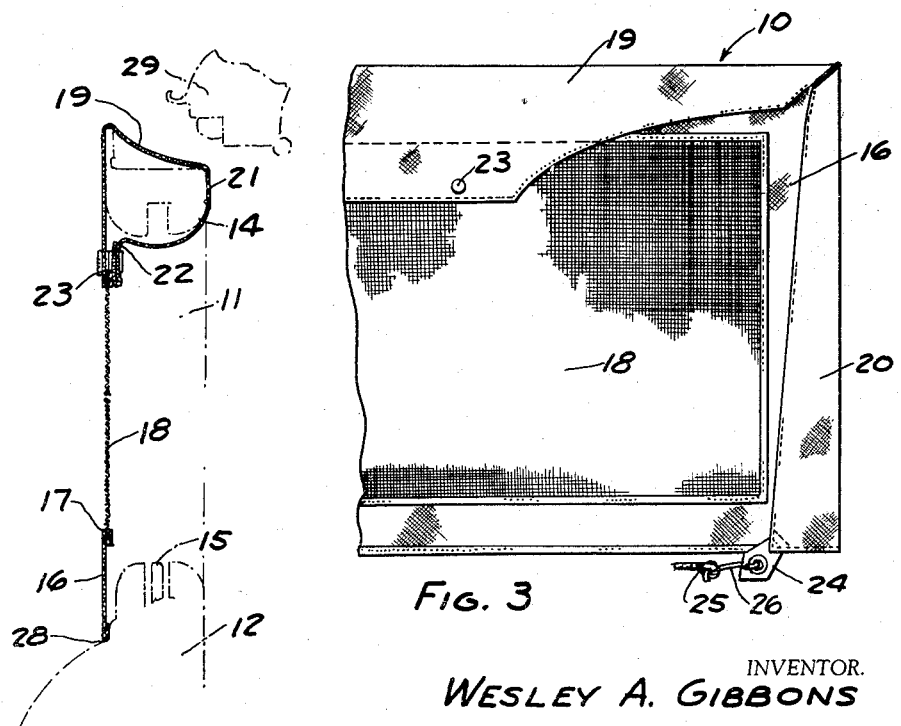
Fig. 2
Fig. 3
INVENTOR.
WESLEY A. GIBBONS
BY
Barnes, Kisselle, Laughlin & Raisch
ATTORNEYS

United States Patent Office 2,937,700
Patented May 24, 1960

2,937,700
WINDOW SCREENS FOR AUTOMOBILES
Wesley A. Gibbons, 607 Hanna St., Birmingham, Mich.
Filed Apr. 29, 1957, Ser. No. 655,823
2 Claims. (Cl. 160—354)

This invention relates to window screens for automobiles and particularly to a removable window screen for the window opening in the door of an automobile.

In present-day automobiles and particularly station wagons it has become common to use the automobile for sleeping and camping purposes. In such use, it is desirable to have a removable window screen for the window in the door of the automobile to provide ventilation and to keep out insects and the like.

It is therefore an object of this invention to provide a removable window screen for the window opening in the door of an automobile.

It is a further object of this invention to provide such a window screen which may be easily mounted and taken down.

It is a further object of this invention to provide such a window screen which is compact and may be easily stored when not in use.

It is a further object of this invention to provide such a window screen which is low in cost.

In the drawings:

Fig. 1 is a perspective view of the window screen embodying the invention in position over a window opening in a door.

Fig. 2 is a sectional view taken along the line 2—2 in Fig. 1, portions of the automobile being shown in dotted lines.

Fig. 3 is a fragmentary view on an enlarged scale showing the window screen removed from the door of an automobile.

Referring to Fig. 1, window screen 10 embodying the invention is adapted to be mounted over a window opening 11 in door 12. The window opening 11 is formed by the door 12, upright frame members 13 and cross frame member 14. Door 12 is of conventional construction and includes a window 15 (Fig. 2) which may be rolled up and down to close opening 11.

Window screen 10 comprises a rectangular panel 16 of flexible material with a configuration generally similar to the configuration of the upper part of the door formed by frame members 13, 14. Panel 16 may be formed of a cloth, canvas, plastic coated cloth or similar suitable material. Flexible panel 16 is formed with an opening 17 and a rectangular piece of screen material 18 is secured to panel 16 over the opening 17. Screen 18 may be formed of suitable flexible material such as cloth netting or a plastic material but is preferably formed of fiberglass, which is heat and weather resistant and very durable. A top flap 19 is secured along the upper edge of panel 16 and side flaps 20 are secured along the side edges of panel 16. The ends of top flap 19 are secured to the upper ends of side flaps 20.

The width of top flap 19 and side flaps 20 is substantially the same as the width of frame members 13, 14 except for the central portion 21 of top flap 19 which is of sufficient length to wrap around frame member 14 so that the end 22 thereof may be secured to panel 16 as by means of snap fasteners 23. Side flaps 20 have tabs 24 at their lower free ends and the tabs have grommeted eyelets as shown. A cord 25, preferably having elastic characteristics, has one end secured to one eyelet such as by a knotted connection and has a hook 26 detachably securing its other end to the other eyelet.

Window screen 10 is applied to the door 12 after first opening the door 12. Top flap 19 is disposed over frame member 14 and side flaps 20 are disposed over side frame members 13. The end 22 of central portion 21 of top flap 19 is looped over the frame member 14 and through opening 11 and is secured to the rectangular panel by the snap fasteners 23. Cord 25 is pulled downwardly and engaged with some portion of the interior of the automobile such as door handle 27. Cord 25 is arranged to be relatively taut when extending directly between tabs 24 so that it will tend to hold the screen in place even if there is no automobile part such as handle 27 over which the cord can be conveniently stretched.

In position the window screen, as shown in Fig. 2, provides an insect-proof opening over the window opening. The lower edge 28 of the rectangular panel 16 provides a seal with the outer surface of the door 12. When the door 12 is closed top panel 19 is clamped between frame member 14 and the top 29 of the automobile. Side flaps 20 are similarly clamped between frame members 13 and the sides of the automobile.

It can thus be seen that I have provided a removable window screen which provides an effective insect-proof ventilating closure for the opening in the door of an automobile. The window screen may be quickly mounted and taken down and, being made of flexible material, can be easily rolled or folded into compact form for storage. In addition, since the window screen is made of flexible material the several parts thereof can be secured together by sewing, and the cost of the window screen is therefore relatively low.

I claim:

1. A screen for the window of an automobile comprising, an open centered sheet of flexible material having generally the shape and size of the portion of an automobile which forms a frame defining a window opening, a flexible screen secured over the open center of said sheet of flexible material, a plurality of flexible tie flaps secured to edge portions of said sheet, said tie flaps extending in a direction transverse to the general plane of said sheet of material and having a length in said direction which generally approximates the thickness of the window frame so that when said sheet of material and screen are disposed over a window opening the tie flaps overlie adjacent side portions of the window frame, the ends of adjacent tie flaps being secured together for a substantial part of their said lengths, one of said tie flaps having a portion intermediate its ends with an additional length such that said intermediate portion can be wrapped around one frame member of the window and attached to said flexible sheet, and means attached to portions of the tie flaps at opposite ends of said sheet and at a side of said sheet opposite said one tie flap, the latter said means being operable to draw said portions of the tie flaps attached thereto toward each other to secure said screen in position.

2. In a screen for the window opening in the door of an automobile the combination comprising, a generally rectangular panel of flexible sheet material having an opening therein, said flexible panel having a top edge, bottom edge and side edges, a top flap connected to said top edge, a side flap connected to each of said side edges, said top and side flaps having a width generally approximating the thickness of the portion of the automobile defining the window opening, the top ends of said side flaps being secured to the ends of said top flap through a substantial portion of the widths of said flaps, said top flap having an intermediate portion between said ends thereof with an additional width so that said intermediate portion can be wrapped around the horizontal cross piece at the top of the door, means for securing the end of said intermediate portion of said top flap to said flexible panel, and means for drawing the bottom end portions of said side flaps toward each other.

References Cited in the file of this patent
UNITED STATES PATENTS

| | | |
|---|---|---|
| 2,665,754 | Claussen et al. | Jan. 12, 1954 |
| 2,717,036 | Harris | Sept. 6, 1955 |
| 2,725,096 | Granby | Nov. 29, 1955 |